(12) United States Patent
Shan

(10) Patent No.: US 11,284,310 B2
(45) Date of Patent: Mar. 22, 2022

(54) SINGLE RADIO VOICE CALL CONTINUITY HANDOVER

(71) Applicant: Apple Inc., Cupertino, CA (US)

(72) Inventor: Changhong Shan, Portland, OR (US)

(73) Assignee: Apple Inc., Cupertino, CA (US)

(*) Notice: Subject to any disclaimer, the term of this patent is extended or adjusted under 35 U.S.C. 154(b) by 172 days.

(21) Appl. No.: 16/273,975

(22) Filed: Feb. 12, 2019

(65) Prior Publication Data

US 2019/0182718 A1 Jun. 13, 2019

Related U.S. Application Data

(60) Provisional application No. 62/629,551, filed on Feb. 12, 2018, provisional application No. 62/642,506, filed on Mar. 13, 2018.

(51) Int. Cl.
| | |
|---|---|
| H04W 36/00 | (2009.01) |
| H04W 60/04 | (2009.01) |
| H04W 76/16 | (2018.01) |
| H04W 8/08 | (2009.01) |
| H04W 76/11 | (2018.01) |
| H04W 8/22 | (2009.01) |

(52) U.S. Cl.
CPC ......... *H04W 36/0022* (2013.01); *H04W 8/08* (2013.01); *H04W 8/22* (2013.01); *H04W 36/0033* (2013.01); *H04W 60/04* (2013.01); *H04W 76/11* (2018.02); *H04W 76/16* (2018.02)

(58) Field of Classification Search
CPC ........... H04W 8/06; H04W 8/08; H04W 8/22; H04W 36/0022; H04W 36/0033; H04W 60/04; H04W 76/11; H04W 76/16
See application file for complete search history.

(56) References Cited

U.S. PATENT DOCUMENTS

| | | | |
|---|---|---|---|
| 2011/0280217 A1* | 11/2011 | Drevon | H04W 48/18 370/331 |
| 2015/0131619 A1* | 5/2015 | Zhu | H04W 36/0079 370/332 |
| 2019/0191467 A1* | 6/2019 | Dao | H04W 76/12 |
| 2019/0297538 A1* | 9/2019 | Keller | H04W 36/0022 |

OTHER PUBLICATIONS

Nokia, "TS 38.413 v0.6.0 covering agreements of RAN3 NR AdHoc 1801," 3GPP TSG-RAN WG3 NR AdHoc 1801, R3-180651, Agenda item: 10, France, Jan. 22-26, 2018, Sophia Antipolis, 1 page.

* cited by examiner

*Primary Examiner* — Khoa Huynh
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for single radio voice call continuity handover from next-generation radio access network to universal terrestrial radio access network, and return to the next-generation radio access network after single radio voice call continuity service. Other embodiments may be described and claimed.

19 Claims, 10 Drawing Sheets

SINGLE RADIO VOICE CALL CONTINUITY HANDOVER

CROSS REFERENCE TO RELATED APPLICATION

The present application claims priority to U.S. Provisional Patent Application No. 62/629,551 filed Feb. 12, 2018, and entitled "Single Radio Voice Call Continuity Handover," and to U.S. Provisional Patent Application No. 62/642,506 filed Mar. 13, 2018 and entitled "Single Radio Voice Call Continuity (SRVCC) Handover and Return to Next Generation Radio Access Network (NG-RAN) after SRVCC," the entire disclosures of which are hereby incorporated by reference in their entireties.

FIELD

Embodiments of the present invention relate generally to the technical field of wireless communications.

BACKGROUND

Mobile communication has evolved significantly from early voice systems to highly sophisticated integrated communication platforms. The next generation wireless communication system, 5G, or New Radio (NR), will provide access to information and sharing of data by various users and applications. NR is expected to be a unified network/system that targets to meet vastly different and sometimes conflicting performance dimensions and services. Such diverse multi-dimensional requirements are driven by different services and applications. In general, NR will evolve based on $3^{rd}$ Generation Partnership Project (3GPP) Long Term Evolution (LTE)-Advanced with additional potential new Radio Access Technologies (RATs) to provide better, simple and seamless wireless connectivity. NR will enable everything connected by wireless and deliver fast, rich contents and services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In some scenarios, if single radio voice call continuity (SRVCC) handover from next generation radio access network (NG-RAN) to a universal terrestrial radio access network (UTRAN) circuit switched (CS) is not supported, the voice call continuity may not be supported. One such scenario may be when both voice over long term evolution (VoLTE) and voice over fifth generation (Vo5G) are supported in operator's network, but there is no overlapping coverage between long term evolution (LTE) supporting VoLTE and NG-RAN supporting Vo5G (for example, when a user equipment (UE) moves to an area where only UTRAN coverage is available during an ongoing voice call). Another scenario may be when VoLTE is not supported, but Vo5G is supported in operator's network (for example, when UE moves to an area where only UTRAN coverage is available during an ongoing voice call).

Various embodiments of this disclosure introduce concepts to support SRVCC handovers. These concepts may include updates to various messages transmitted in registration and handover procedures.

Figure 1:
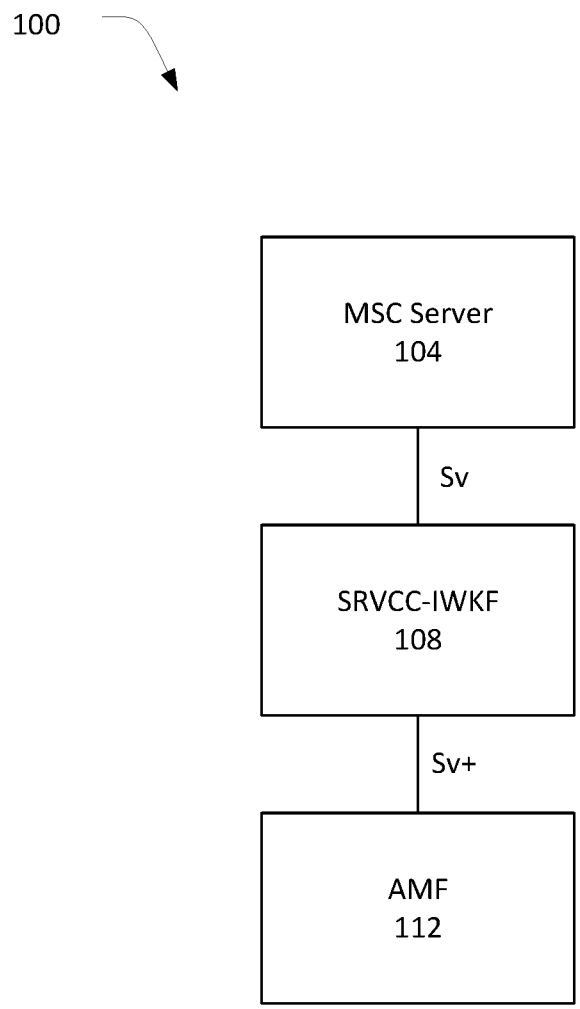
FIG. 1 illustrates an architecture in accordance with some embodiments.

FIG. 1 illustrates an architecture 100 in accordance with some embodiments. The architecture 100 may include a mobile switching center (MSC) server 104, a SRVCC-interworking function (IWKF) 108, and an access and mobility management function (AMF) 112 coupled with each other at least as shown.

Each of the MSC server 104 and the SRVCC-IWKF 108 may terminate an Sv reference point (which may also be referred to as an "Sv interface") that exists between the two elements. The Sv interface may be similar to that used between a mobility management entity (MME) and an MSC server as defined in, for example, 3GPP Technical Specification (TS) 23.216, v15.1.0 (2017 December).

Each of the SRVCC-IWKF 108 and the AMF 112 may terminate an Sv+ reference point (or "Sv+ interface") that exists therebetween.

The MSC server 104 may provide various communication switching functions such as, but not limited to, call set up, release, and routing.

Figure 7:
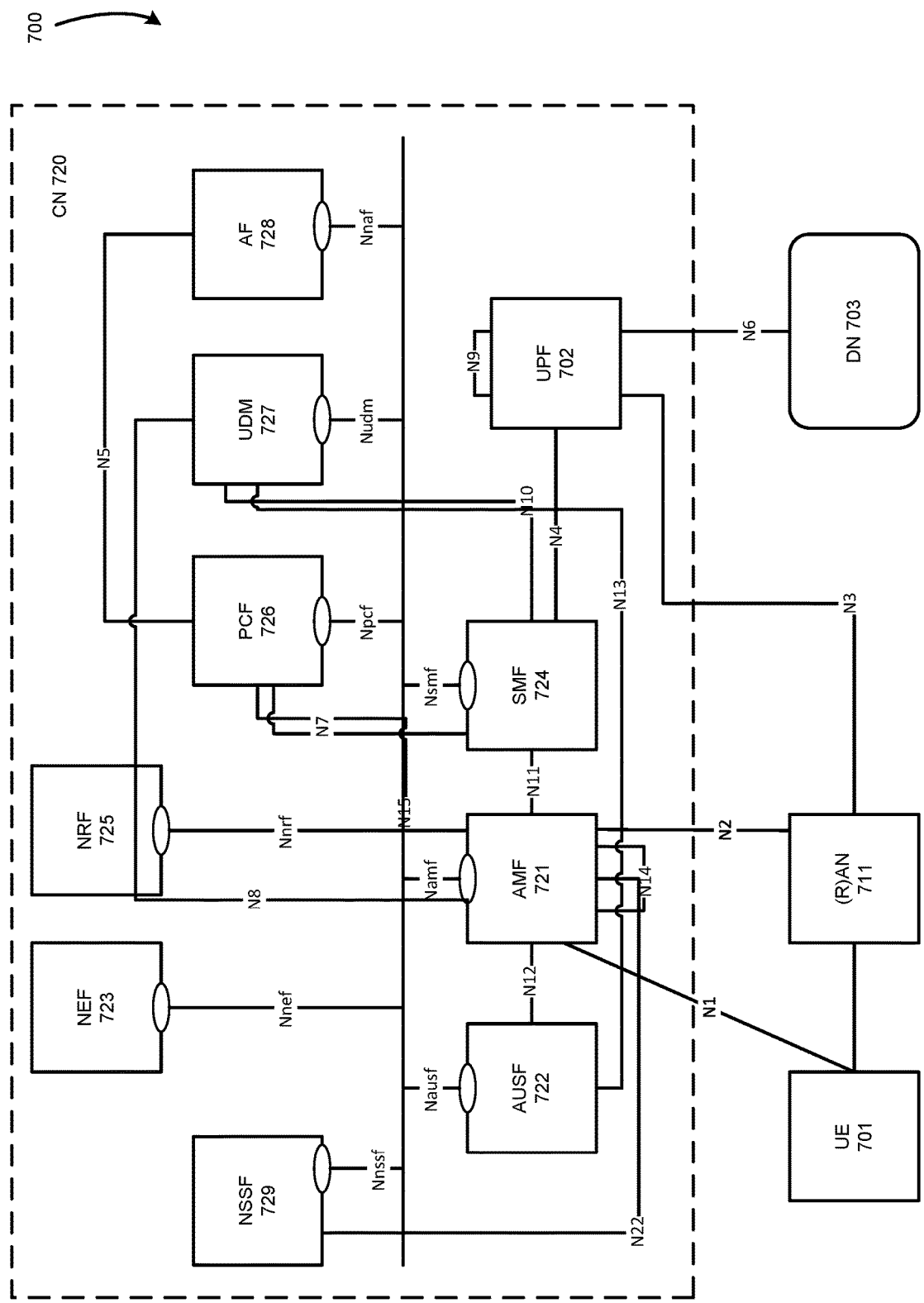
FIG. 7 illustrates another architecture of a system of a network in accordance with some embodiments.

The AMF 112 may be similar to, and substantially interchangeable with, AMF 721 described in FIG. 7. The AMF 112 may be responsible for various management tasks (for example, registration, connection, reachability, etc.), and lawful interception of AMF-related events, and access authentication and authorization.

Use of the SRVCC-IWKF 108 may avoid having to introduce a new interface between AMF 112 and the MSC server 104. In this manner, impact to the MSC server 104 may be avoided by reusing the Sv interface defined in TS 23.216.

In various embodiments, the SRVCC-IWKF 108 may be a standalone function or collocated with an MME or the AMF 112. In embodiments in which the SRVCC-IWKF 108 is collocated with an MME, for example, when an operator has deployed N26-based interworking between fifth generation system (5GS) and an evolved packet system (EPS), an N26 interface may be enhanced to support Sv+ interface. Thus, in embodiments in which the SRVCC-IWKF 108 is collocated with the MME, an N26 interface between the AMF and the MME may support the communications described herein with respect to the Sv+ interface.

During a UE registration procedure, a UE may need to indicate its capability of supporting SRVCC handover (HO) from NG-RAN to UTRAN to the AMF 112 in a non-access stratum (NAS) mobility management (MM) message. The AMF 112 may need to send a new indication of "SRVCC operation possible" to NG-RAN over N2 interface. These and other embodiments will be more fully described herein.

Figure 2:
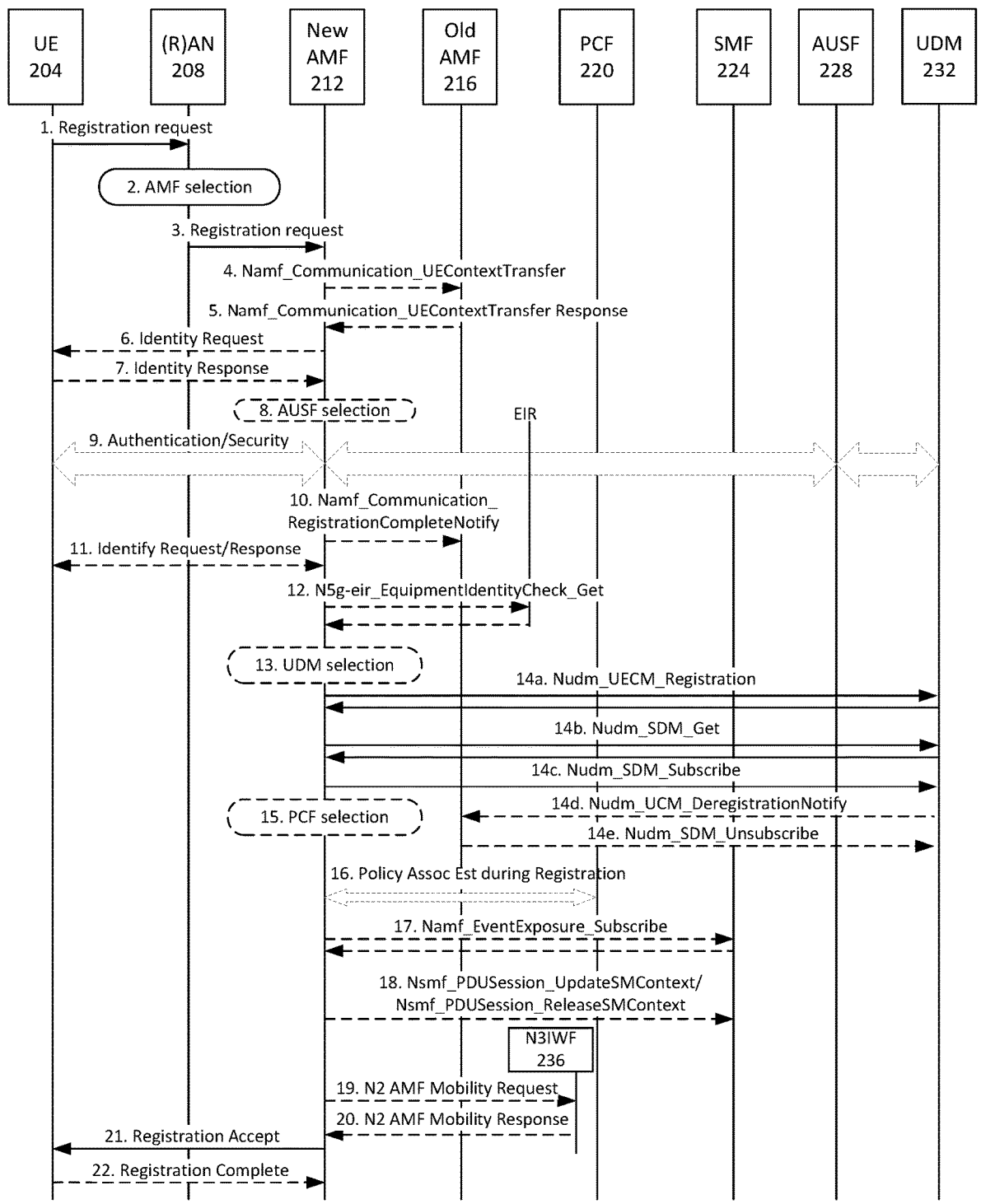
FIG. 2 illustrates an example registration procedure in accordance with some embodiments.

FIG. 2 illustrates an example registration procedure 200 in accordance with various embodiments. The registration procedure 200 may enable, at least in part, SRVCC HO from an NG-RAN to UTRAN operation in 5GS in accordance with some embodiments. The registration procedure 200 may be similar to a registration procedure described in 3GPP TS 23.502, v15.0.0 (2017 December); however, the below procedure provides improvements to facilitate SRVCC handovers.

The registration procedure 200 includes operations performed by each of the following network elements: UE 204; (radio) access network ((R)AN) 208 or simply (AN 208); a new AMF 212 (for example, an AMF to which a call is being transferred); an old AMF 216 (for example, an AMF from which a call is being transferred); a PCF 220; and SMF 224; an authentication server function (AUSF) 228; and a unified data management (UDM) function 232. These network elements may be described in further detail elsewhere herein. Operations of the registration procedure 200 may be described as numerated operations 1-22 among these various network elements. In some embodiments, some of these operations may be performed in sequences other than that shown.

At 1, the UE 204 may transmit a Registration Request message to the AN 208. The Registration Request message, which may also be referred to AN message, may include AN parameters and RM-NAS Registration Request (Registration type, subscription concealed identifier (SUCI) or subscription permanent identifier (SUPI) or 5G-globally unique temporary identifier (GUTI), last visited tracking area identifier (TAI) (if available), Security parameters, Requested network slice selection assistance information (NSSAI), Mapping Of Requested NSSAI, UE 5G network capability, protocol data unit (PDU) Session status, PDU Session(s) to be re-activated, Follow on request, and mobile initiated connection only (MICO) mode preference).

In case of NG-RAN, the AN parameters include, for example, SUCI or SUPI or the 5G-GUTI, the Selected public land mobile network (PLMN) ID and Requested NSSAI, the AN parameters may also include an establishment cause that is to provide the reason for requesting the establishment of an RRC connection.

The Registration type indicates if the UE 204 wants to perform an Initial Registration (for example, the UE 204 is in RM-DEREGISTERED state), a Mobility Registration Update (for example, the UE 204 is in an RM-REGISTERED state and initiates a Registration procedure due to mobility), a Periodic Registration Update (for example, the UE 204 is in RM-REGISTERED state and initiates a Registration procedure due to the Periodic Registration Update timer expiry, see, for example, clause 4.2.2.2.1 of TS 23.502) or an Emergency Registration (for example, the UE 204 is in limited service state).

The UE 204 performing an Initial Registration (for example, the UE 204 is in RM-DEREGISTERED state) to a PLMN for which the UE 204 does not already have a 5G-GUTI, the UE 204 shall include its SUCI or SUPI in the Registration Request. The SUCI is included if and only if the home network has provisioned the public key to protect SUPI in the UE 204 (see, for example, TS 33.501 v0.7.0 (2018 January)). If the UE previously received a UE Configuration Update Command indicating that the UE needs to re-register and the 5G-GUTI is invalid, the UE 204 may perform an Initial Registration and include the SUPI in the Registration Request message. For an Emergency Registration, the SUPI may be included if the UE does not have a valid 5G-GUTI available; a permanent equipment identifier (PEI) may be included when the UE 204 has no SUPI and no valid 5G-GUTI. In other cases, the 5G-GUTI may be included and it may indicate the last serving AMF. If the UE 204 is already registered via a non-3GPP access in a PLMN different from the new PLMN (for example, not the registered PLMN or an equivalent PLMN of the registered PLMN) of the 3GPP access, the UE 204 may not provide over the 3GPP access the 5G-GUTI allocated by the AMF during the Registration procedure over the non-3GPP access. Also, if the UE 204 is already registered via a 3GPP access in a PLMN (for example, the registered PLMN), different from the new PLMN (for example, not the registered PLMN or an equivalent PLMN of the registered PLMN) of the non-3GPP access, the UE 204 not provide over the non-3GPP access the 5G-GUTI allocated by the AMF during the Registration procedure over the 3GPP access. The UE 204 may provide its usage setting based on its configuration (see, for example, clause 5.16.3.7 of TS 23.501 v15.0.0 (2017 December)). In case of Initial Registration or Mobility Registration Update, the UE 204 may include the Mapping Of Requested NSSAI, which is the mapping of each single-NSSAI (S-NSSAI) of the Requested NSSAI to the S-NSSAIs of the Configured NSSAI for the home PLMN (HPLMN), to ensure that the network is able to verify whether the S-NSSAI(s) in the Requested NSSAI are permitted based on the Subscribed S-NSSAIs.

If available, the last visited TAI may be included in order to help an AMF produce Registration Area for the UE 204.

The security parameters are used for authentication and integrity protection (see, for example, TS 33.501). Requested NSSAI indicates the network slice selection assistance information (see, for example, clause 5.15 of TS 23.501). The PDU Session status indicates the previously established PDU Sessions in the UE 204. When the UE 204 is connected to the two AMFs belonging to different PLMNs via 3GPP access and non-3GPP access then the PDU Session status indicates the established PDU Session of the current PLMN in the UE 204. The PDU Session(s) to be re-activated is included to indicate the PDU Session(s) for which the UE 204 intends to activate user plane (UP) connections. A PDU Session corresponding to a local area data network (LADN) may not be included in the PDU Session(s) to be re-activated when the UE 204 is outside the area of availability of the LADN. The Follow on request may be included when the UE 204 has pending uplink signaling and the UE 204 does not include PDU Session(s) to be re-activated, or the Registration type indicates the UE 204 wants to perform an Emergency Registration.

The UE capability of supporting SRVCC handover from NG-RAN to UTRAN may be included in UE 5G capability information. The new AMF 212 may provide the UE 5G capability information to an MME, which may store this capability information in the UE's mobility management (MM) context.

At 2, the AN 208 may perform an AMF selection. In some embodiments, if a SUPI is included or the 5G-GUTI does not indicate a valid AMF, the AN 208, based on (radio) access technology ((R)AT) and Requested NSSAI, if available, selects an AMF, for example, new AMF 212.

The (R)AN selects an AMF consistent with AMF selection description in clause 6.3.5 of 3GPP TS 23.501. If UE 204 is in connection management (CM)-CONNECTED state, the AN 208 can forward the Registration Request message to the new AMF 212 based on the N2 connection of the UE 204.

If the AN 208 cannot select an appropriate AMF, it may forward the Registration Request to an AMF that has been configured, in the AN 208, to perform AMF selection.

At 3, the AN 208 may send the Registration Request message to the new AMF 212. The Registration Request message may be an N2 message that includes N2 parameters and RM-NAS Registration Request (Registration type, SUPI or 5G-GUTI, last visited TAI (if available), Security parameters, Requested NSSAI, Mapping Of Requested NSSAI, UE 5GC Capability, PDU Session status, PDU Session(s) to be re-activated, Follow on request, and MICO mode preference).

When NG-RAN is used, the N2 parameters may include the Selected PLMN ID, Location Information, Cell Identity and the RAT type related to the cell in which the UE 204 is camping.

When NG-RAN is used, the N2 parameters may also include the Establishment cause.

If the Registration type indicated by the UE 204 is Periodic Registration Update, then operations 4 to 17 may be omitted.

At 4, in certain conditions, the new AMF 212 may transmit a context request message to the old AMF 216. The context request message may request information regarding a context of the UE 204 and may be referred to as a Namf_Communication_UEContextTransfer (complete Registration Request).

If the UE's 5G-GUTI was included in the Registration Request and the serving AMF has changed since last Registration procedure, the new AMF 212 may invoke a Namf_Communication_UEContextTransfer service operation on the old AMF 216 including the complete Registration Request IE, which may be integrity protected, to request the UE's SUPI and MM Context. The old AMF 216 may use the integrity protected complete Registration request IE to verify if the context transfer service operation invocation corresponds to the UE requested.

The old AMF 216 may also transfer event subscriptions information by each network function (NF) consumer, for the UE 204, to the new AMF 212. The NF consumers may not need to subscribe for the events once again with the new AMF 212 after the UE 204 is successfully registered with the new AMF 212.

If the new AMF 212 has already received UE contexts from the old AMF 216 during handover procedure, then operations 4, 5, and 10 may be skipped.

For an Emergency Registration, if the UE 204 identifies itself with a 5G-GUTI that is not known to the AMF 212, operations 4 and 5 may be skipped and the AMF 212 may immediately request the SUPI from the UE 204. If the UE 204 identifies itself with PEI, the SUPI request may be skipped. Allowing Emergency Registration without a user identity may be dependent on local regulations.

At 5, in certain conditions, the old AMF 216 may transmit a context response message to the new AMF 212. The context response message may be in response to the Namf_Communication_UEContextTransfer (SUPI, MM Context, SMF information, PCF ID) and may be referred to as a Namf_Communication_UEContextTransferResponse. The old AMF 216 may respond to the new AMF 212 for the Namf_Communication_UEContextTransfer invocation by including the UE's SUPI and MM Context.

If the old AMF 216 holds information about established PDU Sessions, the old AMF 216 may include SMF information including S-NSSAI(s), SMF identities and PDU Session ID.

If old AMF 216 holds information about active NG application protocol (NGAP) UE-transport network layer association (TNLA) bindings to a non-3GPP interworking function (N3IWF), the old AMF 216 may include information about the NGAP UE-TNLA bindings.

At 6, in certain conditions, the new AMF 212 may send an identity request message to the UE 204.

If the SUPI is not provided by the UE 204 nor retrieved from the old AMF 216, the Identity Request procedure may be initiated by the new AMF 212 sending the Identity Request message to the UE 204 requesting the SUCI.

At 7, in certain conditions, the UE 204 may send an identity response message to the new AMF 212. The UE 204 may respond with the Identity Response message, which may include the SUCI. The UE 204 may derive the SUCI by using the provisioned public key of the HPLMN.

At 8, the new AMF 212 may decide to initiate UE authentication by invoking an AUSF. In that case, the AMF 212 select an AUSF, for example, AUSF 228, based on SUPI or SUCI, as described in TS 23.501, clause 6.3.4.

If the new AMF 212 is configured to support Emergency Registration for unauthenticated SUPIs and the UE 204 indicated Registration type Emergency Registration, the AMF 212 may skip the authentication and security setup or the AMF 212 may accept that the authentication may fail and continues the registration procedure.

At 9, the AUSF 228 may execute authentication of the UE 204. The authentication may be performed as described in TS 33.501, by Nudm_UEAuthenticate_Get operation. The AUSF 228 may discover a UDM, for example, UDM 232 as described in, for example, TS 23.501, clause 6.3.8. In case the AMF 212 provided a SUCI to AUSF 228, the AUSF 228 shall return the SUPI to AMF 212 only after the authentication is successful.

If network slicing is used, the AMF 212 may decide if the Registration Request needs to be rerouted as described in, for example, clause 4.2.2.2.3 of TS 23.502, where the initial AMF refers to the AMF.

Also at 9, the AMF 212 may initiate NAS security functions. The NAS security may be performed as described in TS 33.501.

Also at 9, upon completion of NAS security function setup, the AMF 212 may initiate NGAP procedure as specified in, for example, TS 38.413 v0.5.0 (2017 December). This is to enable 5G-AN use it for securing procedures with the UE 204.

Also at 9, the 5G-AN may store the security context and send an acknowledgment to the AMF 212. The 5G-AN may use the security context to protect the messages exchanged with the UE 204 as described in, for example, TS 33.501.

If the AMF has changed the new AMF 212 may notify the old AMF 216 that the registration of the UE 204 in the new AMF 212 is completed by invoking the Namf_Communication_RegistrationCompleteNotify service operation at 10. This may include the new AMF 212 sending a registration complete message to the old AMF 216. The registration complete message may be a Namf_Communication_RegistrationCompleteNotify message.

If the authentication/security procedure fails, then the Registration may be rejected, and the new AMF 212 may invoke a Namf_Communication_RegistrationCompleteNotify service operation with a reject indication reason code towards the old AMF 216. The old AMF 216 continues as if the UE context transfer service operation was never received.

If one or more of the S-NSSAIs used in the old Registration Area cannot be served in the target Registration Area, the new AMF 212 determines which PDU Session cannot be supported in the new Registration Area. The new AMF 212 invokes the Namf_Communication_RegistrationCompleteNotify service operation including the rejected PDU Session ID and a reject cause (for example, the S-NSSAI becomes no longer available) towards the old AMF 216. Then the new AMF 212 modifies the PDU Session Status correspondingly. The old AMF 216 informs the corresponding SMF(s) to locally release the UE's SM context by invoking the Nsmf_PDUSession_ReleaseSMContext service operation. Details of Namf_Communication_RegistrationCompleteNotify service operation may be similar to those described in clause 5.2.2.2.3 of TS 23.502.

At 11, in some conditions the new AMF 212 may perform an Identity Request/Response (PEI) operation with the UE 204. If the PEI was not provided by the UE 204 nor retrieved from the old AMF 216 the Identity Request procedure may be initiated by AMF 212 sending an Identity Request message to the UE 204 to retrieve the PEI. The PEI may be transferred encrypted unless the UE 204 performs Emergency Registration and cannot be authenticated. For an Emergency Registration, the UE 204 may have included the PEI in the Registration Request. If so, the PEI retrieval may be skipped.

At 12, the new AMF to 12 may optionally initiate ME identity check by invoking the N5g-eir_EquipmentIdentityCheck_Get service operation (see, for example, clause 5.2.4.2.2 of TS 23.502). The PEI check may be performed as described in clause 4.7 of TS 23.502. For an Emergency Registration, if the PEI is blocked, operator policies may determine whether the Emergency Registration procedure continues or is stopped.

At 13, if operation 14 is to be performed, the new AMF 212 may select a UDM (for example, UDM 232) based on the SUPI. The UDM 232 may select a UDR instance. See, for example, TS 23.501, clauses 6.3.8 and 6.3.9.

At 14*a-b*, if the AMF has changed since the last Registration procedure, or if the UE 204 provides a SUPI which doesn't refer to a valid context in the AMF 212, or if the UE 204 registers to the same AMF it has already registered to a non-3GPP access (for example, the UE 204 is registered over a non-3GPP access and initiates this Registration procedure to add a 3GPP access), the new AMF 212 registers with the UDM 232 using Nudm_UECM_Registration and subscribes to be notified when the UDM 232 deregisters this AMF 212. The UDM 232 stores the AMF identity associated to the Access Type and does not remove the AMF identity associated to the other Access Type. UDM 232 may store information provided at registration in UDR, by Nudr_UDM_Update.

The AMF to 12 may retrieve Access and Mobility subscription data and SMF Selection Subscription data using Nudm_SDM_Get. This may require that UDM 232 may retrieve this information from UDR by Nudr_UDM_Query (Access and Mobility Subscription data). After a successful response is received, the AMF 212 subscribes to be notified using Nudm_SDM_Subscribe when the data requested is modified, UDM 232 may subscribe to UDR by Nudr_UDM_ Subscribe. The GPSI is provided to the AMF 212 in the subscription data from the UDM if the GPSI is available in the UE subscription data.

The new AMF 212 may provide the Access Type it serves for the UE 204 to the UDM to 32 and the Access Type may be set to "3GPP access." The UDM 232 stores the associated Access Type together with the serving AMF 212 in UDR by Nudr_UDM_Update.

The new AMF 212 may create an MM context for the UE 204 after getting the mobility subscription data from the UDM 232.

For an Emergency Registration in which the UE 204 was not successfully authenticated, the AMF 212 shall not register with the UDM 232.

For an Emergency Registration, the AMF 212 shall not check for access restrictions, regional restrictions or subscription restrictions. For an Emergency Registration, the AMF 212 may ignore any unsuccessful registration response from UDM 232 and continue with the Registration procedure.

At 14*c*, when the UDM 232 stores the associated Access Type together with the serving AMF 212 as indicated in operation 14*a*, it may cause the UDM 232 to initiate a Nudm_UECM_DeregistrationNotification (see, for example, clause 5.2.3.2.2 of the TS 23.502) to the old AMF 216 corresponding to 3GPP access, if one exists. The old AMF 216 removes the MM context of the UE 204. If the serving NF removal reason indicated by the UDM is Initial Registration, then the old AMF 216 invokes the Namf_EventExposure_Notify service operation towards all the associated SMFs of the UE 204 to notify that the UE 204 is deregistered from old AMF 216. The SMF 224 may release the PDU Session(s) on getting this notification.

At 14*d*, the old AMF 216 may unsubscribe with the UDM 232 for subscription data using Nudm_SDM_unsubscribe.

At 15, the AMF 212 may decide to initiate PCF communication, e.g., the AMF 212 has not yet obtained Access and Mobility policy for the UE 204 or if the Access and Mobility policy in the AMF 212 are no longer valid, the AMF 212 may select a PCF, for example, PCF 220. In case the new AMF 212 receives a PCF ID from the old AMF 216 in operation 5 and successfully contacts the PCF identified by the PCF ID, the AMF 212 may select the (V-)PCF identified by the PCF ID. If the PCF identified by the PCF ID cannot be used (for example, no response from the PCF) or there is no the PCF ID received from the old AMF 216 in operation 5, the AMF 212 selects a PCF as described in, for example, TS 23.501, clause 6.3.7.1.

At 16, the new AMF 212 may optionally perform a Policy Association Establishment during Registration procedure as defined in, for example, clause 4.16.1.2 of TS 23.502. For an Emergency Registration, this operation may be skipped.

If the new AMF contacts the PCF 220 identified by the (V-)PCF ID received during inter-AMF mobility in operation 5, the new AMF 212 may include the PCF-ID in the Npcf_AMPolicyControl Get operation. This indication may not be included by the AMF during initial registration procedure.

If the AMF 212 notifies the Mobility Restrictions (e.g., UE location) to the PCF 220 for adjustment, or if the PCF 220 updates the Mobility Restrictions itself due to some conditions (e.g. application in use, time and date), the PCF 220 may provide the updated Mobility Restrictions to the AMF 212.

At 17, the PCF 220 may invoke Namf_EventExposure_Subscribe service operation for UE event subscription.

At 18, in some conditions, the AMF 212 may invoke a Nsmf_PDUSession_UpdateSMContext service operation or a Nsmf_PDUSession_ReleaseSMContext service operation and send a context update/release message to the SMF 224. For an Emergency Registered UE, this step is applied when the Registration Type is Mobility Registration Update.

If the AMF 212 invokes a Nsmf_PDUSession_UpdateSMContext service operation, it may send a Nsmf_PDUSession_UpdateSMContext message (see, for example, clause 5.2.8.2.6 in TS 23.502) in the following scenario(s). If the "PDU Session(s) to be re-activated" is included in the Registration Request in operation 1, the AMF 212 may send Nsmf_PDUSession_UpdateSMContext Request to SMF(s) associated with the PDU Session(s) to activate User Plane connections of the PDU Session(s). From operation 5 onwards (e.g., described in clause 4.2.3.2 of TS 23.502) may be executed to complete the User Plane connection activation without sending MM NAS Service Accept from the AMF 212 to AN 208 described in operation 12. The SMF 224 may decide to trigger, for example, the intermediate UPF insertion, removal or change of PSA as described in operation 5 (for example, in clause 4.2.3.2 of TS 23.502). In the case that the intermediate UPF insertion, removal, or relocation is performed for the PDU Session(s) not included in "PDU Session(s) to be re-activated", the procedure may be performed without N11 and N2 interactions to update the N3 user plane between (R)AN and 5GC.

If the AMF 212 invokes a Nsmf_PDUSession_ReleaseSMContext service operation, it may send a Nsmf_PDUSession_ReleaseSMContext message to the SMF 224 in the following scenarios. If any PDU Session status indicates that it is released at the UE 204, the AMF 212 invokes the Nsmf_PDUSession_ReleaseSMContext service operation towards the SMF 224 in order to release any network resources related to the PDU Session.

If the Registration type indicated by the UE is Periodic Registration Update, then operation 20 may be omitted.

If the serving AMF is changed, the new AMF 212 may wait until operation 17 is finished with all the SMFs associated with the UE 204. Otherwise, operations 18 to 22 can continue in parallel to this operation.

The mobility related event notifications towards the NF consumers may be triggered at the end of this procedure for certain cases (see, for example, clause 4.15.4 of TS 23.502).

At 19, the new AMF 212 may send a mobility request message, for example, a N2 AMF Mobility Request, to a N3IWF 236. This may be done if the AMF has changed and the new AMF 212 is creating an NGAP UE association towards the N3IWF 236 to which the UE 204 is connected.

At 20, the N3IWF 236 may send a mobility response message, for example, N2 AMF Mobility Response, to the AMF 212.

At 21, the new AMF 212 may send a Registration Accept message to the UE 204. The Registration Accept message may include 5G-GUTI, Registration Area, Mobility restrictions, PDU Session status, Allowed NSSAI, [Mapping Of Allowed NSSAI], Periodic Registration Update timer, LADN Information and accepted MICO mode, IMS Voice over PS session supported Indication, Emergency Service Support indicator, etc.

The Registration Accept message may indicate that the Registration Request has been accepted. 5G-GUTI may be included if the AMF 212 allocates a new 5G-GUTI. If the AMF 212 allocates a new Registration area, it may send the Registration area to the UE 204 via the Registration Accept message. If there is no Registration area included in the Registration Accept message, the UE 204 may consider the old Registration Area as valid. Mobility Restrictions is included in case mobility restrictions applies for the UE 204 and Registration Type is not Emergency Registration. The AMF 212 indicates the established PDU Sessions to the UE in the PDU Session status. The UE 204 removes locally any internal resources related to PDU Sessions that are not marked as established in the received PDU Session status. When the UE 204 is connected to the two AMFs belonging to different PLMN via 3GPP access and non-3GPP access then the UE 204 removes locally any internal resources related to the PDU Session of the current PLMN that are not marked as established in received PDU Session status. If the PDU Session status information was in the Registration Request, the AMF 212 may indicate the PDU Session status to the UE 204. The Mapping Of Allowed NSSAI is the mapping of each S-NSSAI of the Allowed NSSAI to the S-NSSAIs of the Configured NSSAI for the HPLMN. The AMF 212 may include in the Registration Accept message the LADN Information for LADNs, defined in, for example, TS 23.501 clause 5.6.5, that are available within the Registration area determined by the AMF 212 for the UE 204. If the UE 204 included MICO mode in the request, then AMF 212 responds whether MICO mode should be used. The AMF 212 sets the IMS Voice over PS session supported Indication as described in, for example, clause 5.16.3.2 of TS 23.501.

In order to set the IMS Voice over PS session supported Indication the AMF 212 may need to perform the UE/RAN Radio information and Compatibility Request procedure described in, for example, clause 4.2.8 of TS 23.502 to check the compatibility of the UE 204 and RAN radio capabilities related to IMS Voice over PS. If the AMF 212 has not received Voice Support Match Indicator from the NG-RAN on time then, based on implementation, AMF 212 may set IMS Voice over PS session supported Indication and update it at a later stage. The Emergency Service Support indicator informs the UE 204 that emergency services are supported, for example, the UE 204 is allowed to request PDU Session for emergency services.

In some embodiments, the Handover Restriction List, indication of SRVCC operation possible and UE-AMBR may be provided to AN 208 by AMF 112 in this operation. These elements may be included in the N2 message carrying the Registration Accept message or some other N2 message transmitted from the AMF 212 to the AN 208. The AN 208 may store the indication of SRVCC operation possible in the UE's context and send it to a target RAN in a Xn-based handover procedure.

For an Emergency Registered UE, there may be no AS security context information included in the N2 control messages and there may be no NAS level security when the UE cannot be authenticated.

At 22, in some conditions, the UE 204 may send a registration complete message to the new AMF 212. The UE 204 may send the registration complete message to the AMF 212 to acknowledge that a new 5G-GUTI was assigned. When the "PDU Session(s) to be re-activated" is not included in the Registration Request, the AMF 212 may release the signaling connection with the UE 204, according to, for example, clause 4.2.6 of TS 23.502.

When the Follow on request is included in the Registration Request message, the AMF 212 may not release the signaling connection after the completion of the registration procedure.

If the AMF 212 is aware that some signaling is pending in the AMF 212 or between the UE 204 and the 5GC, the AMF 212 may not release the signaling connection immediately after the completion of the registration procedure.

Figure 3:
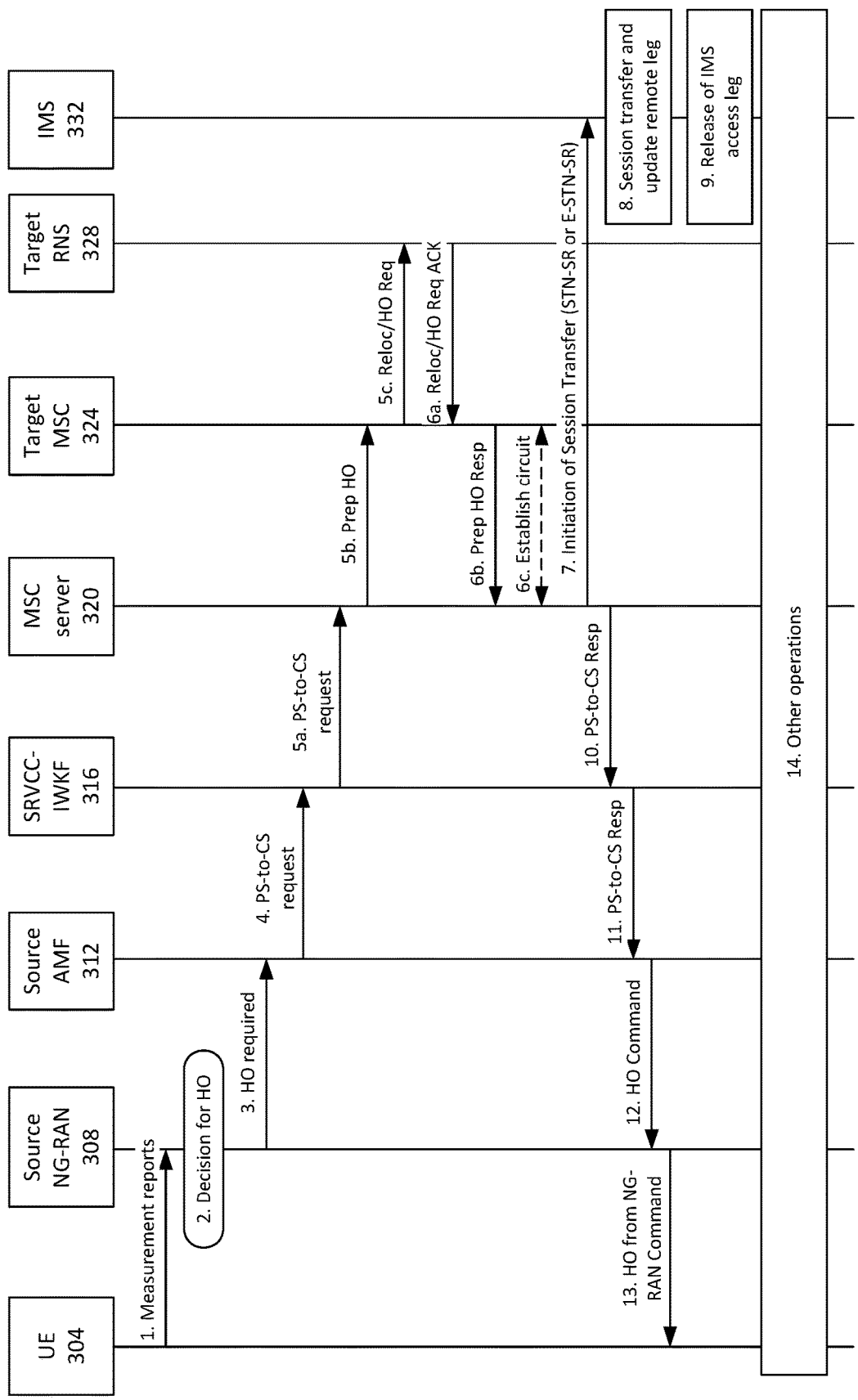
FIG. 3 illustrates an example handover procedure in accordance with some embodiments.

FIG. 3 illustrates an SRVCC HO procedure 300 in accordance with some embodiments. The SRVCC HO procedure 300 may be conducted between a variety of network elements including a UE 304; a source NG-RAN 308 (whose operations may be performed by one or more access nodes of the source NG-RAN 308); a source AMF 312; an SRVCC-IWKF 316; an MSC server 320; a target MSC 324; a target radio network subsystem (RNS) 328; and an IMS 332. These elements may be similar to like-named network elements described elsewhere herein.

The SRVCC HO procedure 300 may be a handover from an NG-RAN (for example, the source NG-RAN 308) to a UTRAN-CS. The SRVCC HO procedure 300 may be similar, in some aspects, to EUTRAN to UTRAN SRVCC HO procedure without packets switch (PS) HO as described, for example, in clause 6.2.2.2 of TS 23.216. In general, unless otherwise described, messages and parameters defined in TS 23.216 for Sv and the interfaces within a UTRAN-CS and between MSC and IMS can be reused. However, the SRVCC HO procedure 300 discussed below differs from TS 23.216 for at least the reasons that the procedure 300 further includes use of SRVCC indications in the various operations described below, and generation, use, and transmission of various security contexts.

At 1, the UE 304 may send measurement reports to the source NG-RAN 308. The measurement reports may be triggered-based, periodic, push, pull, etc. PS HO is not supported. The source NG-RAN 308 may then rely on these measurement reports to make a decision to trigger a handover to UTRAN CS at 2.

At 3, the source NG-RAN 308 may send a handover required message to the source AMF 312. The handover required message may include an SRVCC indication, which is an indication that the handover is triggered by a 5G SRVCC operation.

At 4, the source AMF 312 may send a PS-to-CS request message to the SRVCC-IWKF 316. In some embodiments, the PS-to-CS message may include a mapped EPS security context from 5GS security context. This may, in some instances, allow an authentication procedure to be skipped.

At 5a, the SRVCC-IWKF 316 may send the PS-to-CS request message to the MSC server 320. The PS-to-CS request message may be the same message received from the source AMF 312; however, contents of the message may be updated by the SRVCC-IWKF 316 prior to being sent on to the MSC server 320.

In some embodiments, the SRVCC-IWKF 316 may generate a UTRAN CS security context from the mapped EPS security context that was included in the PS-to-CS message received from the source AMF 312. The SRVCC-IWKF 316 may send the UTRAN CS security context to the MSC server 320 in the PS-to-CS request message sent at 5a.

At 5b, the MSC server 320 may send a prepare handover message to the target MSC 324. If the MSC server 320 receives the UTRAN CS security context in the PS-to-CS request message received from the SRVCC-IWKF 316, the MSC server 320 may send the UTRAN CS security context to the target MSC 320 in the prepare handover message.

The SRVCC indication, a last-used 5GS PLMN ID, or both may be included in the messages transmitted at 4, 5a, and 5b to support returning to a last-used 5GS PLMN.

When the MSC server 320 receives the SRVCC indication, the last-used 5GS PLMN ID, or both, it may store it/them in a UE's context.

Upon receiving the SRVCC indication, the last used 5GS PLMN ID, or both, the target MSC 324 may store them in a UE's context.

At 5c, the target MSC 324 may send a relocation/handover request to the target RNS 328.

At 6a, the target RNS 328 may send a relocation/handover request acknowledgment message to the target MSC 324.

At 6b, the target MSC 324 may send a prepare handover response message to the MSC server 320.

At 6c, the MSC server 320 and the target MSC 324 may establish a circuit.

At 7, the MSC server 320 may send a message to the IMS 332 the causes initiation of a session transfer. In some embodiments, the message at 7 may be an STN-SR or an E-STN-SR.

The IMS 332 may perform a session transfer an update the remote leg, at 8, and release an IMS access leg at 9.

At 10, the MSC server 320 may send a PS-to-CS response message to the SRVCC-IWKF 316.

At 11, the SRVCC-IWKF 316 may send a PS-to-CS response message to the source AMF 312.

At 12, the source AMF 312 may send a handover command to the source NG-RAN 308.

At 13, the source NG-RAN 308 may send a handover from NG-RAN command to the UE 304.

At 14, the SRVCC HO procedure 300 may include other operations that may be consistent with steps 15-19 in clause 6.2.2.2 of TS 23.216

In some embodiments, wherein an MSC supports a return to NG-RAN after SRVCC, the MSC may indicate this to the UTRAN during a release of radio resource connection that was established for SRVCC by including a last-used 5GS PLMN ID. The UTRAN may take the last-used 5GS PLMN ID into account when selecting a dedicated target frequency list for idle mode mobility to NG-RAN in RR Connection Release with redirection procedure.

Figure 4:
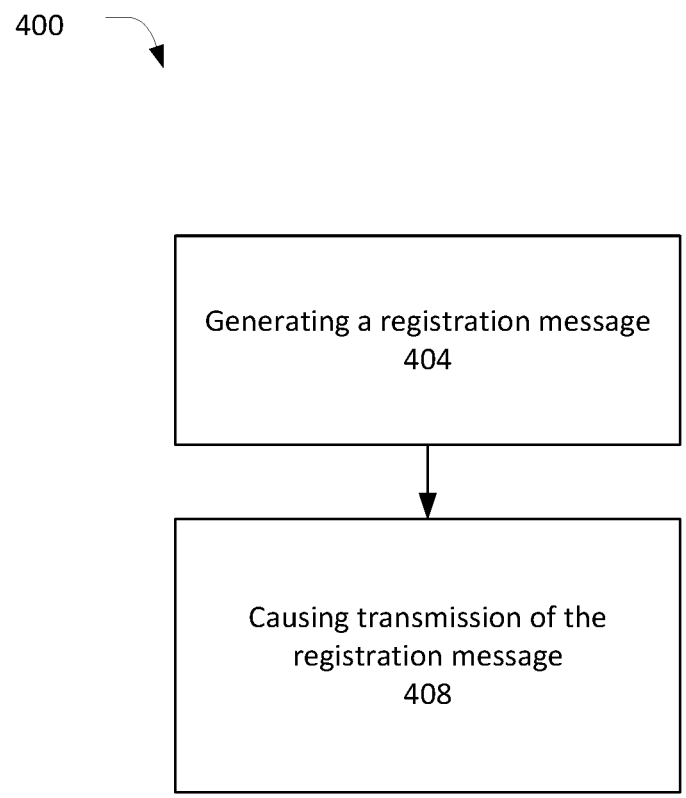
FIG. 4 illustrates an operation flow/algorithmic structure in accordance with some embodiments.

FIG. 4 illustrates an operation flow/algorithmic structure 400 in accordance with some embodiments. The operation flow/algorithmic structure 400 may be part of a registration procedure that may enable, at least in part, SRVCC handover from an NG-RAN to a UTRAN. In some embodiments, the registration procedure may be similar to that shown and described with respect to FIG. 2.

At 404, the operation flow/algorithmic structure 400 may include generating a registration message. In various embodiments the registration message generated may be similar to, and substantially interchangeable with various messages of FIG. 2 including: the Registration Request (for example, generated by the UE 204 or by the AN 208; a Registration Accept message (generated by the new AMF 212 or AN 208).

In some embodiments, the registration message generated may include an indication that SRVCC operation is possible (for example, SRVCC operation is supported by a UE).

At 408, the operation flow/algorithmic structure 400 may include causing transmission of the registration message. In various embodiments, the registration message may be transmitted to an access node (for example, AN 208); an AMF (for example, new AMF 212); or UE (for example, UE 204).

Figure 5:
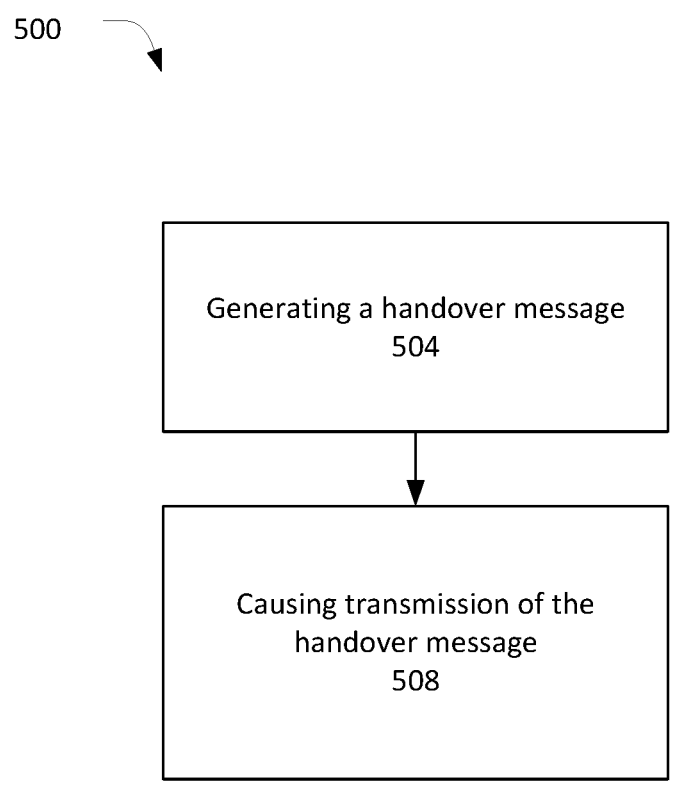
FIG. 5 illustrates another operation flow/algorithmic structure in accordance with some embodiments.

FIG. 5 illustrates an operation flow/algorithmic structure 500 in accordance with some embodiments. The operation flow/algorithmic structure 500 may be part of a handover procedure, for example, an SRVCC handover from an NG-RAN to a UTRAN. In some embodiments, the handover procedure may be similar to that shown and described with respect to FIG. 3.

At 504, the operation flow/algorithmic structure 500 may include generating a handover message. In various embodiments the handover message generated may be similar to, and substantially interchangeable with various messages of FIG. 3 including: the HO required message (for example, generated by an AN of the source NG-RAN 308); the PS-to-CS request message (for example, generated by Source AMF 312 or SRVCC-IWKF 316); prep HO message (for example, generated by MSC server 320); the relocate or handover request/ACK message (for example, generated by target MSC or target RNS 328).

In some embodiments, the handover message generated may include an indication that SRVCC operation is possible (for example, SRVCC operation is supported by a UE). In some embodiments, the handover message may additionally/alternatively include a last-used 5GS PLMN ID. Including the SRVCC indication or the 5GS PLMN ID may support returning to the last-used 5GS PLMN.

At 508, the operation flow/algorithmic structure 500 may include causing transmission of the handover message. In various embodiments, the handover message may be transmitted to an AMF (for example, source AMF 312); an SRVCC-IWKF (for example, SRVCC-IWKF 316); an MSC server (for example, MSC server 320 or target MSC 324); or an RNS (for example, target RNS 328).

The following figures describe systems, devices, and components that may implement various embodiments described herein. Like named elements may be substituted for one another.

Figure 6:
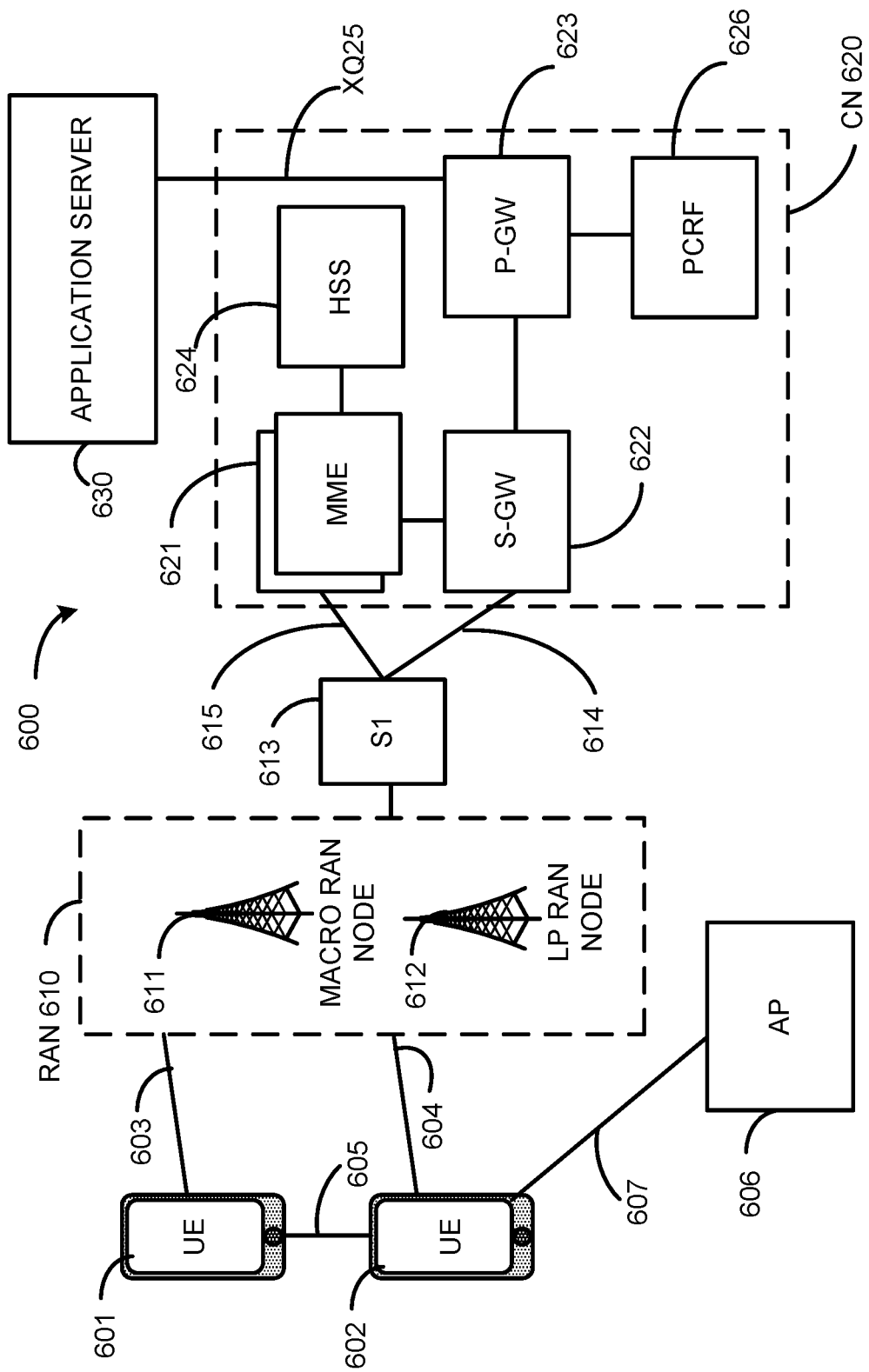
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 601 and 602 are illustrated as smartphones (e.g., handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections (or channels) 603 and 604, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 605 may be used in vehicular applications and communications technologies, which are often referred to as V2X systems. V2X is a mode of communication where UEs (for example, UEs 601, 602) communicate with each other directly over the PC5/SL interface 105 and can take place when the UEs 601, 602 are served by RAN nodes 611, 612 or when one or more UEs are outside a coverage area of the RAN 610. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 601, 602, RAN nodes 611, 612, application servers 630, and pedestrian UEs 601, 602 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 601, 602 may be implemented/employed as Vehicle Embedded Communications Systems (VECS) or vUEs.

The UE 602 is shown to be configured to access an access point (AP) 606 (also referred to as also referred to as "WLAN node 606", "WLAN 606", "WLAN Termination 606" or "WT 606" or the like) via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below). In various embodiments, the UE 602, RAN 610, and AP 606 may be configured to utilize LTE-WLAN aggregation (LWA) operation and/or WLAN LTE/WLAN Radio Level Integration with IPsec Tunnel (LWIP) operation. The LWA operation may involve the UE 602 in RRC CONNECTED being configured by a RAN node 611, 612 to utilize radio resources of LTE and WLAN. LWIP operation may involve the UE 602 using WLAN radio resources (e.g., connection 607) via Internet Protocol Security (IPsec) protocol tunneling to authenticate and encrypt packets (e.g., internet protocol (IP) packets) sent over the connection 607. IPsec tunneling may include encapsulating entirety of original IP packets and adding a new packet header thereby protecting the original header of the IP packets.

The RAN 610 can include one or more access nodes that enable the connections 603 and 604. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620 via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMES 621, the S-GW 622, the Packet Data Network (PDN) Gateway (P-GW) 623, and a home subscriber server (HSS) 624. The MMES 621 may be similar in function to the control plane of legacy Serving General Packet Radio Service (GPRS) Support Nodes (SGSN). The MMES 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

FIG. 7 illustrates an architecture of a system 700 of a network in accordance with some embodiments. The system 700 is shown to include a UE 701, which may be the same or similar to UEs 601 and 602 discussed previously; a RAN node 711, which may be the same or similar to RAN nodes 611 and 612 discussed previously; a Data network (DN) 703, which may be, for example, operator services, Internet access or 3rd party services; and a 5G Core Network (5GC or CN) 720.

The CN 720 may include an Authentication Server Function (AUSF) 722; an Access and Mobility Management Function (AMF) 721; a Session Management Function (SMF) 724; a Network Exposure Function (NEF) 723; a Policy Control function (PCF) 726; a Network Function (NF) Repository Function (NRF) 725; a Unified Data Management (UDM) 727; an Application Function (AF) 728; a User Plane Function (UPF) 702; and a Network Slice Selection Function (NSSF) 729.

The UPF 702 may act as an anchor point for intra-RAT and inter-RAT mobility, an external PDU session point of interconnect to DN 703, and a branching point to support multi-homed PDU session. The UPF 702 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 702 may include an uplink classifier to support routing traffic flows to a data network. The DN 703 may represent various network operator services, Internet access, or third party services. NY 703 may include, or be similar to application server 630 discussed previously. The UPF 702 may interact with the SMF 724 via an N4 reference point between the SMF 724 and the UPF 702.

The AUSF 722 may store data for authentication of UE 701 and handle authentication related functionality. The AUSF 722 may facilitate a common authentication framework for various access types. The AUSF 722 may communicate with the AMF 721 via an N12 reference point between the AMF 721 and the AUSF 722; and may communicate with the UDM 727 via an N13 reference point between the UDM 727 and the AUSF 722. Additionally, the AUSF 722 may exhibit an Nausf service-based interface.

The AMF 721 may be responsible for registration management (e.g., for registering UE 701, etc.), connection management, reachability management, mobility management, and lawful interception of AMF-related events, and access authentication and authorization. The AMF 721 may be a termination point for the an N11 reference point between the AMF 721 and the SMF 724. The AMF 721 may provide transport for Session Management (SM) messages between the UE 701 and the SMF 724, and act as a transparent proxy for routing SM messages. AMF 721 may also provide transport for short message service (SMS) messages between UE 701 and an SMS function (SMSF) (not shown by FIG. 7). AMF 721 may act as Security Anchor Function (SEA), which may include interaction with the AUSF 722 and the UE 701, receipt of an intermediate key that was established as a result of the UE 701 authentication process. Where USIM based authentication is used, the AMF 721 may retrieve the security material from the AUSF 722. AMF 721 may also include a Security Context Management (SCM) function, which receives a key from the SEA that it uses to derive access-network specific keys. Furthermore, AMF 721 may be a termination point of RAN CP interface, which may include or be an N2 reference point between the (R)AN 711 and the AMF 721; and the AMF 721 may be a termination point of NAS (N1) signalling, and perform NAS ciphering and integrity protection.

AMF 721 may also support NAS signalling with a UE 701 over an N3 interworking-function (IWF) interface. The N3IWF may be used to provide access to untrusted entities. N3IWF may be a termination point for the N2 interface between the (R)AN 711 and the AMF 721 for the control plane, and may be a termination point for the N3 reference point between the (R)AN 711 and the UPF 702 for the user plane. As such, the AMF 721 may handle N2 signalling from the SMF 724 and the AMF 721 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 701 and AMF 721 via an N1 reference point between the UE 701 and the AMF 721, and relay uplink and downlink user-plane packets between the UE 701 and UPF 702. The N3IWF also provides mechanisms for IPsec tunnel establishment with the UE 701. The AMF 721 may exhibit an Namf service-based interface, and may be a termination point for an N14 reference point between two AMFs 721 and an N17 reference point between the AMF 721 and a 5G-Equipment Identity Register (5G-EIR) (not shown by FIG. 7).

The SMF 724 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 724 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 724 may be included in the system 700, which may be between another SMF 724 in a visited network and the SMF 724 in the home network in roaming scenarios. Additionally, the SMF 724 may exhibit the Nsmf service-based interface.

The NEF 723 may provide means for securely exposing the services and capabilities provided by 3GPP network functions for third party, internal exposure/re-exposure, Application Functions (e.g., AF 728), edge computing or fog computing systems, etc. In such embodiments, the NEF 723 may authenticate, authorize, and/or throttle the AFs. NEF 723 may also translate information exchanged with the AF 728 and information exchanged with internal network functions. For example, the NEF 723 may translate between an AF-Service-Identifier and an internal 5GC information. NEF 723 may also receive information from other network functions (NFs) based on exposed capabilities of other network functions. This information may be stored at the NEF 723 as structured data, or at a data storage NF using a standardized interfaces. The stored information can then be re-exposed by the NEF 723 to other NFs and AFs, and/or used for other purposes such as analytics. Additionally, the NEF 723 may exhibit an Nnef service-based interface.

The NRF 725 may support service discovery functions, receive NF Discovery Requests from NF instances, and provide the information of the discovered NF instances to the NF instances. NRF 725 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 725 may exhibit the Nnrf service-based interface.

The PCF 726 may provide policy rules to control plane function(s) to enforce them, and may also support unified policy framework to govern network behaviour. The PCF 726 may also implement a front end (FE) to access subscription information relevant for policy decisions in a UDR of the UDM 727. The PCF 726 may communicate with the AMF 721 via an N15 reference point between the PCF 726 and the AMF 721, which may include a PCF 726 in a visited network and the AMF 721 in case of roaming scenarios. The PCF 726 may communicate with the AF 728 via an N5 reference point between the PCF 726 and the AF 728; and with the SMF 724 via an N7 reference point between the PCF 726 and the SMF 724. The system 700 and/or CN 720 may also include an N24 reference point between the PCF 726 (in the home network) and a PCF 726 in a visited network. Additionally, the PCF 726 may exhibit an Npcf service-based interface.

The UDM 727 may handle subscription-related information to support the network entities' handling of communication sessions, and may store subscription data of UE 701. For example, subscription data may be communicated between the UDM 727 and the AMF 721 via an N8 reference point between the UDM 727 and the AMF 721 (not shown by FIG. 7). The UDM 727 may include two parts, an application FE and a User Data Repository (UDR) (the FE and UDR are not shown by FIG. 7). The UDR may store subscription data and policy data for the UDM 727 and the PCF 726, and/or structured data for exposure and application data (including Packet Flow Descriptions (PFDs) for application detection, application request information for multiple UEs 701) for the NEF 723. The Nudr service-based interface may be exhibited by the UDR 721 to allow the UDM 727, PCF 726, and NEF 723 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 724 via an N10 reference point between the UDM 727 and the SMF 724. UDM 727 may also support SMS management, wherein an SMS-FE implements the similar application logic as discussed previously. Additionally, the UDM 727 may exhibit the Nudm service-based interface.

The AF 728 may provide application influence on traffic routing, access to the Network Capability Exposure (NCE), and interact with the policy framework for policy control. The NCE may be a mechanism that allows the 5GC and AF 728 to provide information to each other via NEF 723, which may be used for edge computing implementations. In such implementations, the network operator and third party services may be hosted close to the UE 701 access point of attachment to achieve an efficient service delivery through the reduced end-to-end latency and load on the transport network. For edge computing implementations, the 5GC may select a UPF 702 close to the UE 701 and execute traffic steering from the UPF 702 to DN 703 via the N6 interface. This may be based on the UE subscription data, UE location, and information provided by the AF 728. In this way, the AF 728 may influence UPF (re)selection and traffic routing. Based on operator deployment, when AF 728 is considered to be a trusted entity, the network operator may permit AF 728 to interact directly with relevant NFs. Additionally, the AF 728 may exhibit an Naf service-based interface.

The NSSF 729 may select a set of network slice instances serving the UE 701. The NSSF 729 may also determine allowed Network Slice Selection Assistance Information (NSSAI) and the mapping to the Subscribed Single-NSSAIs (S-NSSAIs), if needed. The NSSF 729 may also determine the AMF set to be used to serve the UE 701, or a list of candidate AMF(s) 721 based on a suitable configuration and possibly by querying the NRF 725. The selection of a set of network slice instances for the UE 701 may be triggered by the AMF 721 with which the UE 701 is registered by interacting with the NSSF 729, which may lead to a change of AMF 721. The NSSF 729 may interact with the AMF 721 via an N22 reference point between AMF 721 and NSSF 729; and may communicate with another NSSF 729 in a visited network via an N31 reference point (not shown by FIG. 7). Additionally, the NSSF 729 may exhibit an Nnssf service-based interface.

As discussed previously, the CN 720 may include an SMSF, which may be responsible for SMS subscription checking and verification, and relaying SM messages to/from the UE 701 to/from other entities, such as an SMS-GMSC/IWMSC/SMS-router. The SMS may also interact with AMF 721 and UDM 727 for notification procedure that the UE 701 is available for SMS transfer (e.g., set a UE not reachable flag, and notifying UDM 727 when UE 701 is available for SMS).

The CN 720 may also include other elements that are not shown by FIG. 7, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 7). Individual NFs may share a UDSF for storing their respective unstructured data or individual NFs may each have their own UDSF located at or near the individual NFs. Additionally, the UDSF may exhibit an Nudsf service-based interface (not shown by FIG. 7). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 7 for clarity. In one example, the CN 720 may include an Nx interface, which is an inter-CN interface between the MME (e.g., MME 621) and the AMF 721 in order to enable interworking between CN 720 and CN 620. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

In yet another example, system 700 may include multiple RAN nodes 711 wherein an Xn interface is defined between two or more RAN nodes 711 (e.g., gNBs and the like) that connecting to 5GC 720, between a RAN node 711 (e.g., gNB) connecting to 5GC 720 and an eNB (e.g., a RAN node 611 of FIG. 6), and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 8:
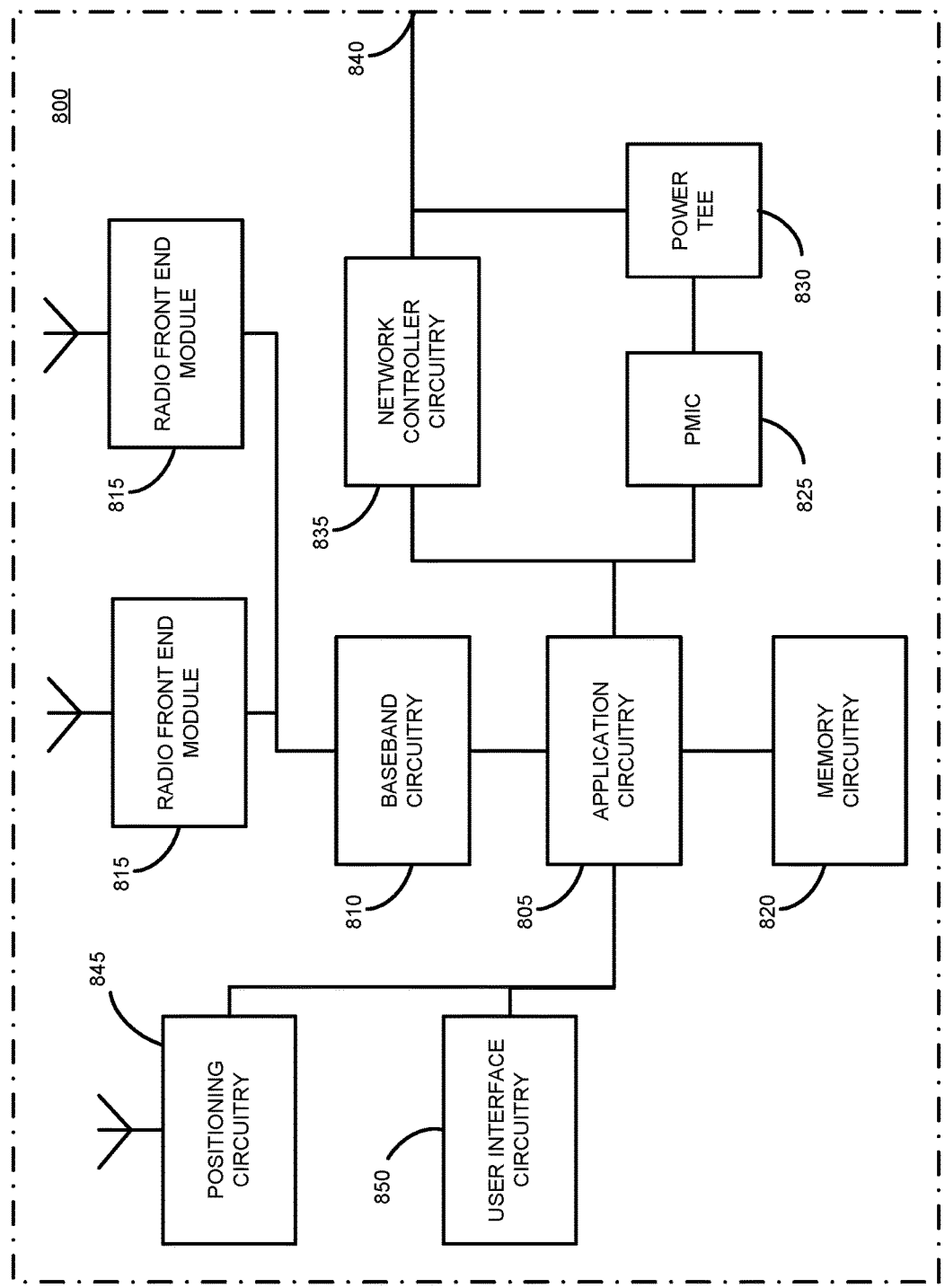
FIG. 8 illustrates an example of an infrastructure equipment in accordance with various embodiments.

FIG. 8 illustrates an example of infrastructure equipment 800 in accordance with various embodiments. The infrastructure equipment 800 (or "system 800") may be implemented as a base station, radio head, RAN node, etc., such as the RAN nodes 611 and 612, and/or AP 606 shown and described previously. In other examples, the system 800 could be implemented in or by a UE, application server(s) 630, and/or any other element/device discussed herein. The system 800 may include one or more of application circuitry 805, baseband circuitry 810, one or more radio front end modules 815, memory 820, power management integrated circuitry (PMIC) 825, power tee circuitry 830, network controller 835, network interface connector 840, satellite positioning circuitry 845, and user interface 850. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 620 (or CN 720 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 805 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 805 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 800 may not utilize application circuitry 805, and instead may include a special-purpose processor/controller to process IP data received from an EPC or 5GC, for example.

Additionally or alternatively, application circuitry 805 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric including and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. Although not shown, baseband circuitry 810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-toanalog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (for example, the radio front end modules 815).

User interface circuitry 850 may include one or more user interfaces designed to enable user interaction with the system 800 or peripheral component interfaces designed to enable peripheral component interaction with the system 800. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 815 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 815. The RFEMs 815 may incorporate both millimeter wave antennas and sub-millimeter wave antennas.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocol. In some implementations, the network controller circuitry 835 may include multiple controllers to provide connectivity to other networks using the same or different protocols.

The positioning circuitry 845, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 845 and/or positioning circuitry implemented by UEs 601, 602, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 845 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 845 may provide data to application circuitry 805 which may include one or more of position data or time data. Application circuitry 805 may use the time data to synchronize operations with other radio base stations (e.g., RAN nodes 611, 612, 711 or the like).

The components shown by FIG. 8 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 9:
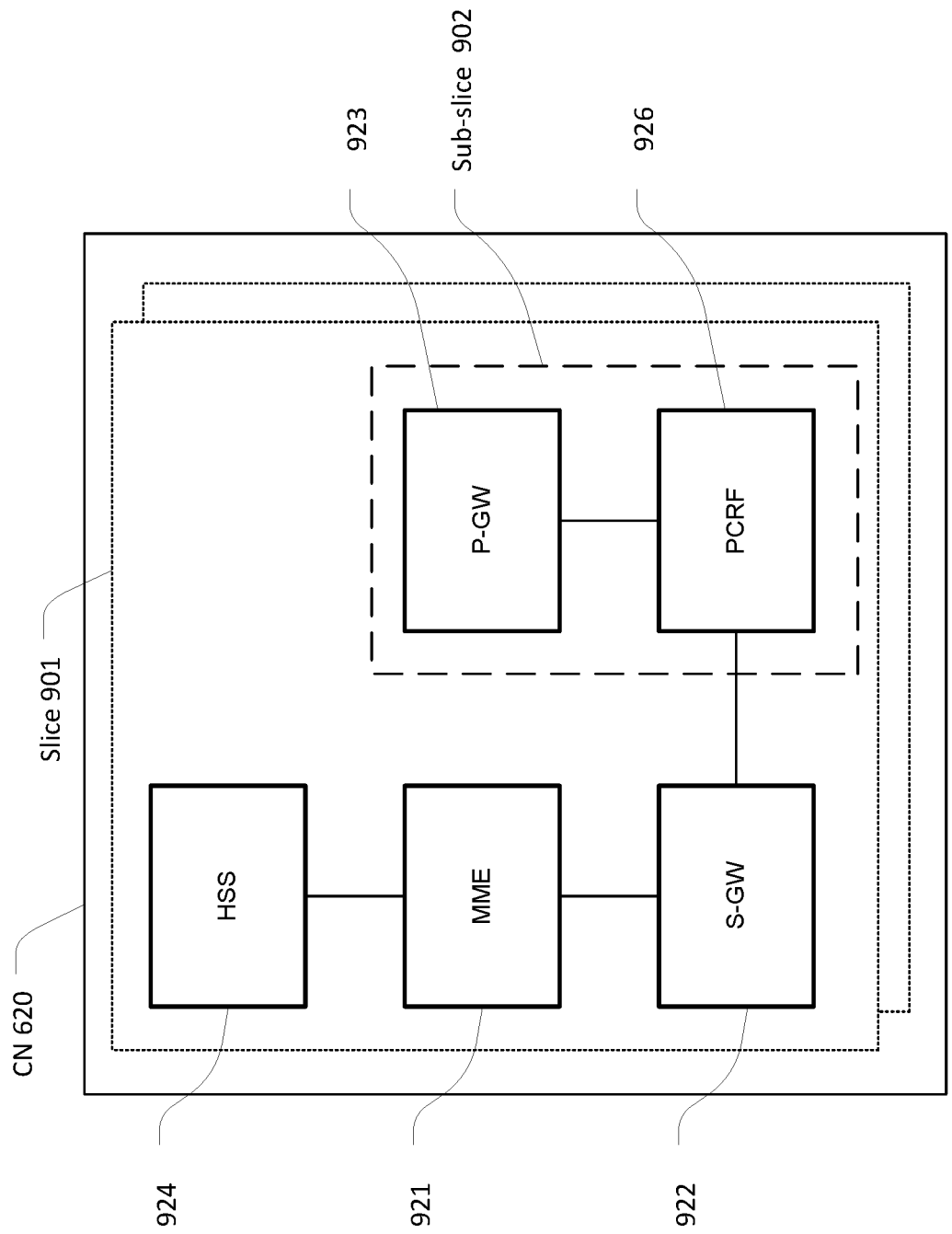
FIG. 9 illustrates components of a core network in accordance with various embodiments.

FIG. 9 illustrates components of a core network in accordance with some embodiments. The components of the CN 620 may be implemented in one physical node or separate physical nodes including components to read and execute instructions from a machine-readable or computer-readable medium (e.g., a non-transitory machine-readable storage medium). In embodiments, the components of CN 720 may be implemented in a same or similar manner as discussed herein with regard to the components of CN 620. In some embodiments, Network Functions Virtualization (NFV) is utilized to virtualize any or all of the above described network node functions via executable instructions stored in one or more computer readable storage mediums (described in further detail below). A logical instantiation of the CN 620 may be referred to as a network slice 901, and individual logical instantiations of the CN 620 may provide specific network capabilities and network characteristics. A logical instantiation of a portion of the CN 620 may be referred to as a network sub-slice 902 (e.g., the network sub-slice 902 is shown to include the PGW 623 and the PCRF 626).

As used herein, the terms "instantiate", "instantiation", and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to set of network functions (NFs) instances and the resources (e.g., compute, storage, and networking resources) required to deploy the network slice.

With respect to 5G systems (see, for example, FIG. 7), a network slice may include the CN control plane and user plane NFs, NG RANs in a serving PLMN, and a N3IWF functions in the serving PLMN. Individual network slices may have different Single Network Slice Selection Assistance Information (S-NSSAI) and/or may have different Slice/Service Types (SSTs). Network slices may differ for supported features and network functions optimizations, and/or multiple network slice instances may deliver the same service/features but for different groups of UEs (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G access node (AN) and associated with eight different S-NSSAIs. Moreover, an AMF instance serving an individual UE may belong to each of the network slice instances serving that UE.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
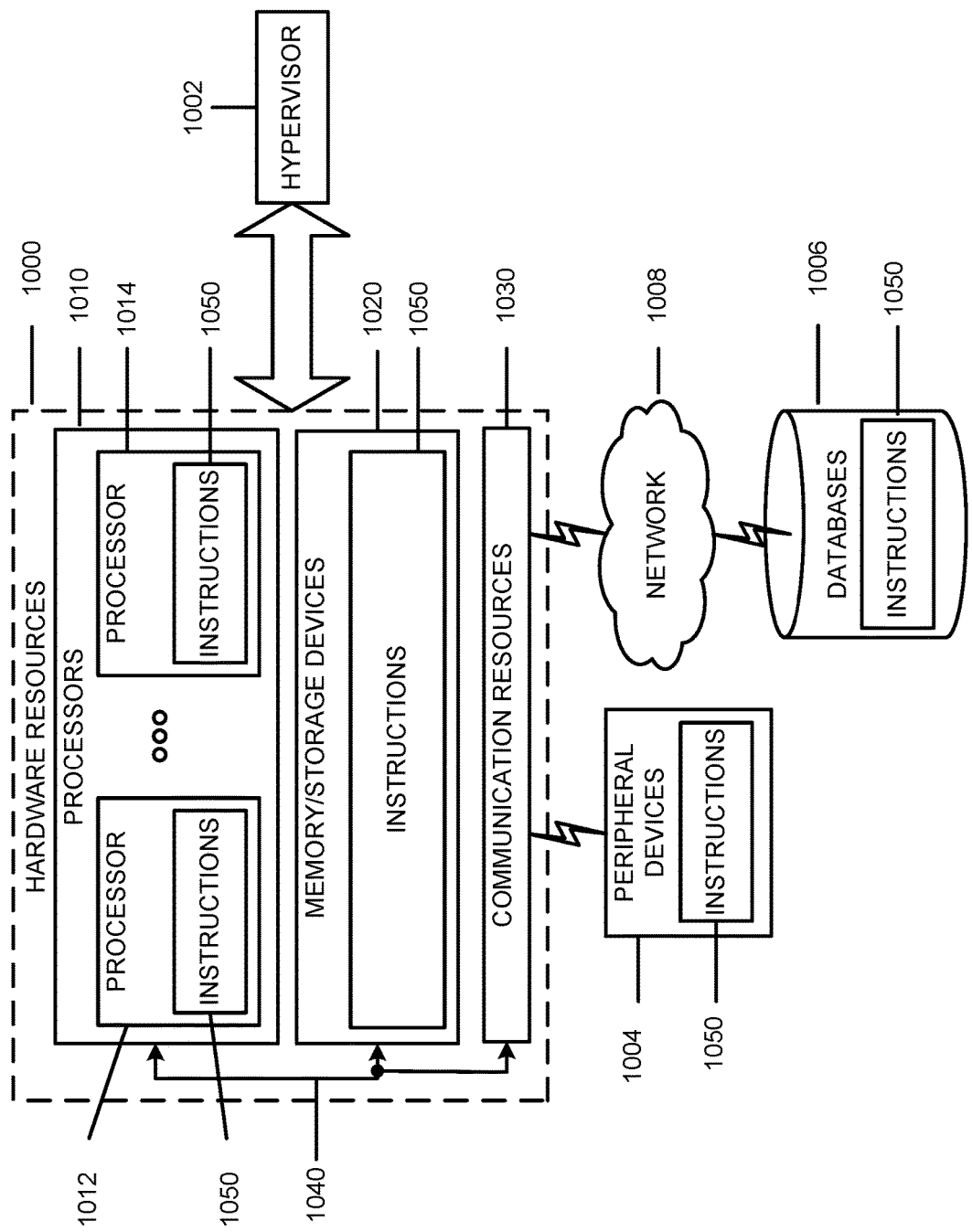
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1002 may be executed to provide an execution environment for one or more network slices/sub-slices to utilize the hardware resources 1000. A "virtualized resource" may refer to compute, storage, and/or network resources provided by virtualization infrastructure to an application, device, system, etc.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

In some embodiments, the electronic device(s), network(s), system(s), chip(s) or component(s), or portions or implementations thereof, of figures herein may be configured to perform one or more processes, techniques, or methods as described herein, or portions thereof.

EXAMPLES

Example 1 may include a new interworking function (SRVCC-IWKF) between AMF and mobile switching center (MSC) server is introduced, the interface between SRVCC-IWKF and MSC server will reuse Sv interface between mobility management entity (MME) and MSC server defined in technical specification (TS) 23.216, the interface between SRVCC-IWKF and access and mobility management function (AMF) is named Sv+. The SRVCC-IWKF can be a standalone function or collocated with MME or AMF.

Example 2 may include the subject matter of example 1 and/or some other examples herein, wherein, during user equipment (UE) registration procedure, the UE needs to indicate its capability of supporting single radio voice call continuity (SRVCC) handover (HO) from next generation radio access network (NG-RAN) to universal mobile telecommunications system terrestrial radio access network (UTRAN) to AMF in the non access stratum (NAS) mobility management (MM) message, wherein the AMF may need to send a new indication of "SRVCC operation possible" to NG-RAN over N2 interface.

Example 3 may include the subject matter of examples 1-2 and/or some other examples herein, wherein, during the SRVCC HO procedure, an SRVCC indication is included in Handover Required message from source NG-RAN to source AMF.

Example 4 may include the subject matter of examples 1-3 and/or some other examples herein, wherein, during the SRVCC HO procedure, an SRVCC indication or last used 5GS PLMN ID or both are included in PS to CS Request message from source AMF to SRVCC-IWKF and from SRVCC-IWKF to MSC Server and further in Prepare HO Request message from MSC Server to target MSC.

Example 5 may include the subject matter of examples 1-4 and/or some other examples herein, wherein the target MSC needs to store the SRVCC indication or last used 5GS PLMN ID or both in UE's CS Context.

Example 6 may include the subject matter of examples 1-5 and/or some other examples herein, wherein, when MSC supports the return to NG-RAN after SRVCC, it indicates this to UTRAN during the release of Radio Resource connection that was established for SRVCC by including the last used 5GS PLMN ID. UTRAN takes the last used 5GS PLMN ID into account when selecting the dedicated target frequency list for idle mode mobility to NG-RAN in RR Connection Release with redirection procedure.

Example 7 may include the subject matter of examples 1-6 and/or some other examples herein, wherein, in order to skip the authentication procedure, the mapped EPS security context from 5GS security context is included in PS to CS Request message in step 4, wherein the SRVCC-IWKF generates the UTRAN CS security context from the mapped EPS security context and sends it to MSC Server in step 5a. The MSC Server further forwards it to target MSC. Example 31 may include may include an apparatus comprising means to perform one or more elements of a method described in or related to any of examples 1-30, or any other method or process described herein.

Example 8 may include the method of operating an AMF, the method comprising generating a Registration Accept message to indicate that a Registration Request has been accepted, the Registration Accept message to include an indication that single radio voice call continuity (SRVCC) operation is possible; and causing transmission of the Registration Accept message to a next-generation radio access network (NG-RAN).

Example 9 may include the method of example 8 or some other example herein, wherein the method further comprises receiving a Registration Request that includes fifth generation (5G) capability information about a user equipment (UE), the 5G capability information to include the indication that the UE supports SRVCC handover from a next-generation radio access network (NG-RAN) to universal terrestrial radio access network (UTRAN).

Example 10 may include the method of example 8 or some other example herein, wherein the method further comprises providing the 5G capability information to a mobility management entity (MME) for storage in a mobility management context associated with the UE.

Example 11 may include the method of example 8 or some other example herein, wherein the method further comprises receiving a registration complete message from the UE, via the NG-RAN, to acknowledge assignment of a fifth generation globally unique temporary identifier (5G-GUTI).

Example 12 may include a method of operating an access node of a next-generation radio access network (NG-RAN), the method comprising: receive a Registration Accept message from an access and mobility management function (AMF), the Registration Accept message to include an indication that single radio voice call continuity (SRVCC) operation is possible; storing the indication in memory circuitry; and sending the indication to a target radio access network.

Example 13 may include the method of example 12 or some other example herein, wherein the method further comprises sending the indication to the target radio access network in a handover procedure.

Example 14 may include the method of example 13 or some other example herein, wherein the handover procedure is an Xn-based handover procedure.

Example 15 may include the method of example 12 or some other example herein wherein the method further comprises sending the Registration Accept message to a user equipment to indicate a Registration Request has been accepted.

Example 16 may include the method of example 12 or some other example herein, wherein the method further comprises transmitting, to the AMF or another AMF, a handover required message that includes an indication.

Example 17 may include a method of operating an SRVCC-IWKF, the method comprising: receiving a packet switch (PS)-to-circuit switch (CS) required message to trigger a handover from a next-generation radio access network (NG-RAN) to a universal terrestrial radio access network (UTRAN), wherein the PS-to-CS request message is to include an indication the handover is triggered by a 5G single radio voice call continuity (SRVCC) operation or a last-used fifth generation system (5GS) public land mobile network (PLMN) identifier (ID); and causing the PS-to-CS request message to be transmitted to a mobile switching center (MSC) server.

Example 18 may include the method of example 17 or some other example herein, wherein the PS-to-CS request message is received from a source access and mobility management function (AMF).

Example 19 may include the method of example 17 or some other example herein, wherein the method further comprises receiving an evolved packet system (EPS) security context, mapped from a fifth generation system (5GS) security context, in the PS-to-CS request message; and generating a universal terrestrial radio access network (UTRAN) CS security context from the EPS security context.

Example 20 may include the method of example 19 or some other example herein wherein the method further comprises sending the UTRAN CS security context to the MSC server in the PS-to-CS request message.

Example 21 may include the method of example 17 or some other example herein, wherein the method further comprises communicating with the MSC server over an Sv interface.

Example 22 may include the method of example 17 or some other example herein, wherein the method further comprises communicating with an access and mobility management function (AMF) over an Sv+ interface.

Example 23 may include the method of example 17 or some other example herein, wherein the method further comprises communicating with an AMF over an N26 interface.

Example 24 may include a method of operating an MSC, the method comprising: receiving a packet switch (PS)-to-circuit switch (CS) required message to trigger a handover from a next-generation radio access network (NG-RAN) to a universal terrestrial radio access network (UTRAN), wherein the PS-to-CS message is to include an indication that the handover is triggered by a 5G single radio voice call continuity (SRVCC) operation or a last-used fifth generation system (5GS) public land mobile network (PLMN) identifier (ID); and causing a prepare handover message to be transmitted to a target MSC server.

Example 25 may include the method of example 24 some other example herein, wherein the method further comprises receiving the PS-to-CS request message from a SRVCC-interworking function (IWKF).

Example 26 may include the method of example 25 or some other example herein wherein the method further comprises receiving the PS-to-CS request message from the SRVCC-IWKF over an Sv interface.

Example 27 may include the method of example 24 or some other example herein, wherein the method further comprises: including the last-used 5GS PLMN ID in a message transmitted during a release of a radio resource connection that was established for SRVCC to indicate, to the UTRAN, that the MSC server supports a return to the NG-RAN after SRVCC.

Example 28 may include one or more non-transitory computer-readable media comprising instructions to cause an electronic device, upon execution of the instructions by one or more processors of the electronic device, to perform one or more elements of a method described in or related to any of examples 1-27, or any other method or process described herein.

Example 29 may include an apparatus comprising logic, modules, or circuitry to perform one or more elements of a method described in or related to any of examples 1-27, or any other method or process described herein.

Example 30 may include a method, technique, or process as described in or related to any of examples 1-27, or portions or parts thereof.

Example 31 may include an apparatus comprising: one or more processors and one or more computer readable media comprising instructions that, when executed by the one or more processors, cause the one or more processors to perform the method, techniques, or process as described in or related to any of examples 1-27, or portions thereof.

Example 32 may include a signal as described in or related to any of examples 1-27, or portions or parts thereof.

Example 33 may include a signal in a wireless network as shown and described herein.

Example 34 may include a method of communicating in a wireless network as shown and described herein.

Example 35 may include a system for providing wireless communication as shown and described herein.

Example 36 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media having instructions that, when executed by one or more processors, cause an access and mobility management function (AMF) to:
generate a message to include an indication that single radio voice call continuity (SRVCC) operation is possible; and
cause transmission of the message to a next-generation radio access network (NG-RAN) over an N2 interface, and cause the NG-RAN to send the indication to a target radio access network in a handover procedure based on a packet switch (PS)-to-circuit switch (CS) request message through a SRVCC-interworking function (SRVCC-IWKF) between the AMF and a mobile switching center (MSC) server, wherein the SRVCC-IWKF is configured to update the PS-to-CS request message by generating a universal terrestrial radio access network (UTRAN) CS security context from a mapped evolved packet system (EPS) security context included in the PS-to-CS request message.

2. The one or more non-transitory, computer-readable media of claim 1, wherein the message is a Registration Accept message and the instructions, when executed, further cause the AMF to: receive a Registration Request that includes fifth generation (5G) capability information about a user equipment (UE), the 5G capability information to include the indication that the UE supports SRVCC handover from a next-generation radio access network (NG-RAN) to UTRAN.

3. The one or more non-transitory, computer-readable media of claim 2, wherein the instructions, when executed, further cause the AMF to: provide the 5G capability information to a mobility management entity (MME) for storage in a mobility management context associated with the UE.

4. The one or more non-transitory, computer-readable media of claim 2, wherein the instructions, when executed, further cause the AMF to: receive a registration complete message from the UE, via the NG-RAN, to acknowledge assignment of a fifth generation globally unique temporary identifier (5G-GUTI).

5. The one or more non-transitory, computer-readable media of claim 2, wherein the Registration Request is an N2 message including N2 parameters.

6. The one or more non-transitory, computer-readable media of claim 5, wherein the N2 parameters include at least two of: Selected public land mobile network (PLMN) identifier (ID), Location Information, Cell Identity, Radio Access Technology (RAT) type, and Establishment cause.

7. The one or more non-transitory, computer-readable media of claim 2, wherein the instructions, when executed, further cause the AMF to: support non-access stratum (NAS) signaling with the UE over an N3 interworking-function (IWF) interface.

8. The one or more non-transitory, computer-readable media of claim 2, wherein the instructions, when executed, further cause the AMF to: transmit a context request message to an old AMF in which the UE was previously registered to request information regarding a context of the UE.

9. The one or more non-transitory, computer-readable media of claim 8, wherein the instructions, when executed, further cause the AMF to: in response to not receiving identity information of the UE from the old AMF, send an Identity Request message to the UE to request the identity information of the UE.

10. The one or more non-transitory, computer-readable media of claim 9, wherein the instructions, when executed, further cause the AMF to: select an authentication server function (AUSF) or a unified data management (UDM) function based on the identity information of the UE.

11. The one or more non-transitory, computer-readable media of claim 10, wherein the instructions, when executed, further cause the AMF to: provide Access Type that is used by the AMF to serve the UE to the UDM.

12. The one or more non-transitory, computer-readable media of claim 11, wherein the instructions, when executed, further cause the AMF to: create a mobility management (MM) context for the UE after getting the mobility subscription data from the UDM.

13. An apparatus to be implemented in an access node of a next-generation radio access network (NG-RAN), the apparatus comprising: memory circuitry; and processing circuitry, coupled with the memory circuitry, the processing circuitry to:
  receive a Registration Accept message from an access and mobility management function (AMF), the Registration Accept message to include an indication that single radio voice call continuity (SRVCC) operation is possible;
  store the indication in the memory circuitry; and
  send the indication to a target radio access network in a handover procedure based on a packet switch (PS)-to-circuit switch (CS) request message transmitted from the AMF to a SRVCC-interworking function (SRVCC-IWKF) between the AMF and a mobile switching center (MSC) server, wherein the SRVCC-IWKF is configured to update the PS-to-CS request message by generating a UTRAN CS security context from a mapped evolved packet system (EPS) security context included in the PS-to-CS request message.

14. The apparatus of claim 13, wherein the SRVCC-IWKF receives the packet PS-to-CS request message transmitted from the AMF to trigger the handover procedure.

15. The apparatus of claim 13, wherein the handover procedure is an Xn-based handover procedure.

16. The apparatus of claim 13, wherein the processing circuitry is further to send the Registration Accept message to a user equipment to indicate a Registration Request has been accepted.

17. The apparatus of claim 13, wherein the processing circuitry is further to transmit, to the AMF or another AMF, a handover required message that includes the indication.

18. The apparatus of claim 16, wherein the Registration Request is an N2 message including N2 parameters.

19. The apparatus of claim 18, wherein the N2 parameters include at least two of: Selected public land mobile network (PLMN) identifier (ID), Location Information, Cell Identity, Radio Access Technology (RAT) type, and Establishment cause.

* * * * *